Dec. 16, 1941.  A. E. BAAK  2,266,144
AUTOMATIC SWITCHING DEVICE
Filed Aug. 4, 1939  3 Sheets-Sheet 2

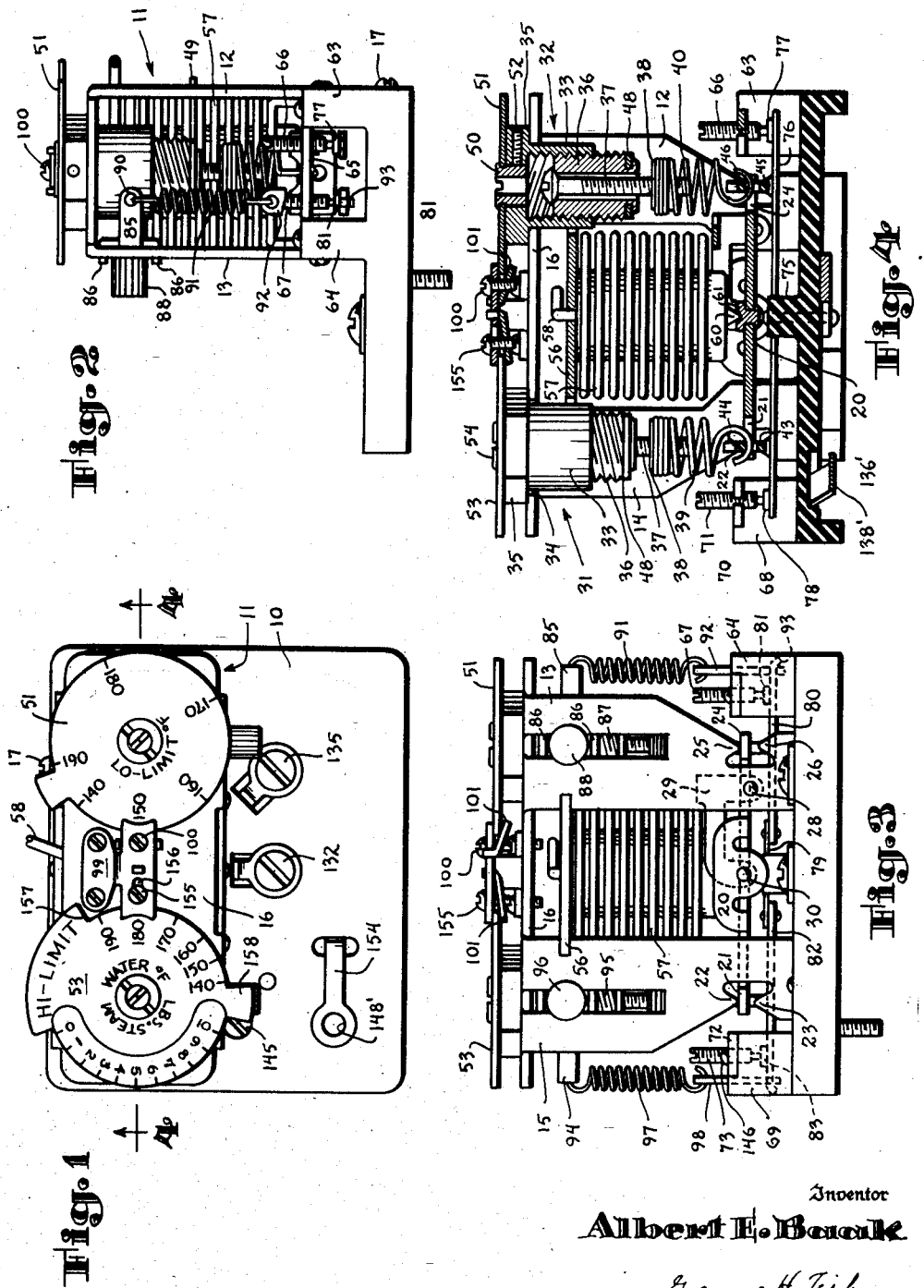

Inventor
Albert E. Baak
By George H. Fisher
Attorney

Dec. 16, 1941.  A. E. BAAK  2,266,144
AUTOMATIC SWITCHING DEVICE
Filed Aug. 4, 1939  3 Sheets-Sheet 3
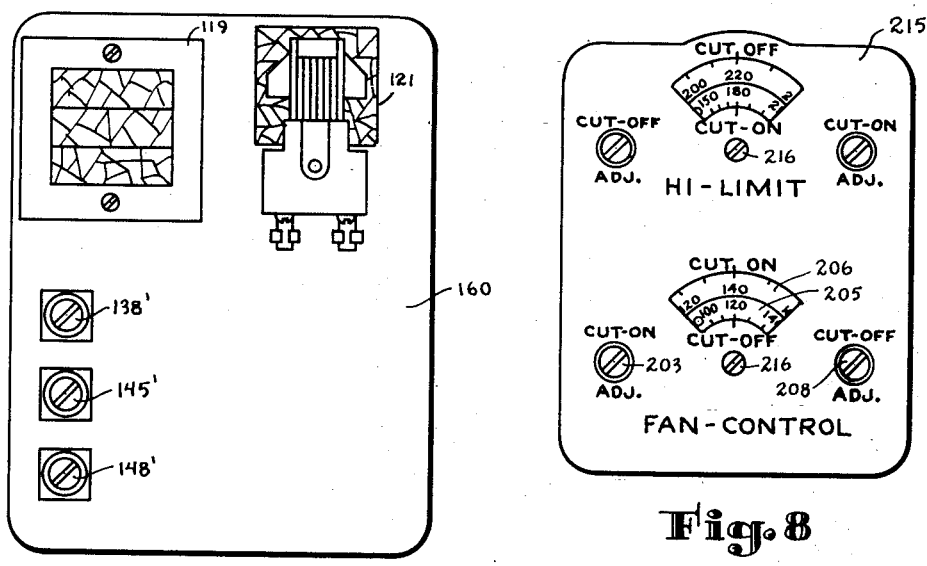
Fig. 7
Fig. 8
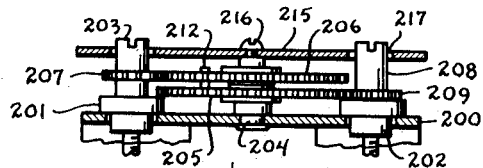
Fig. 10
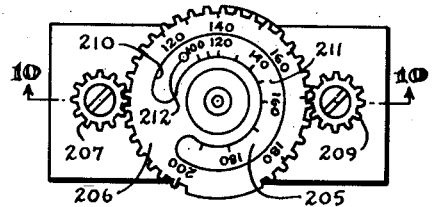
Fig. 9
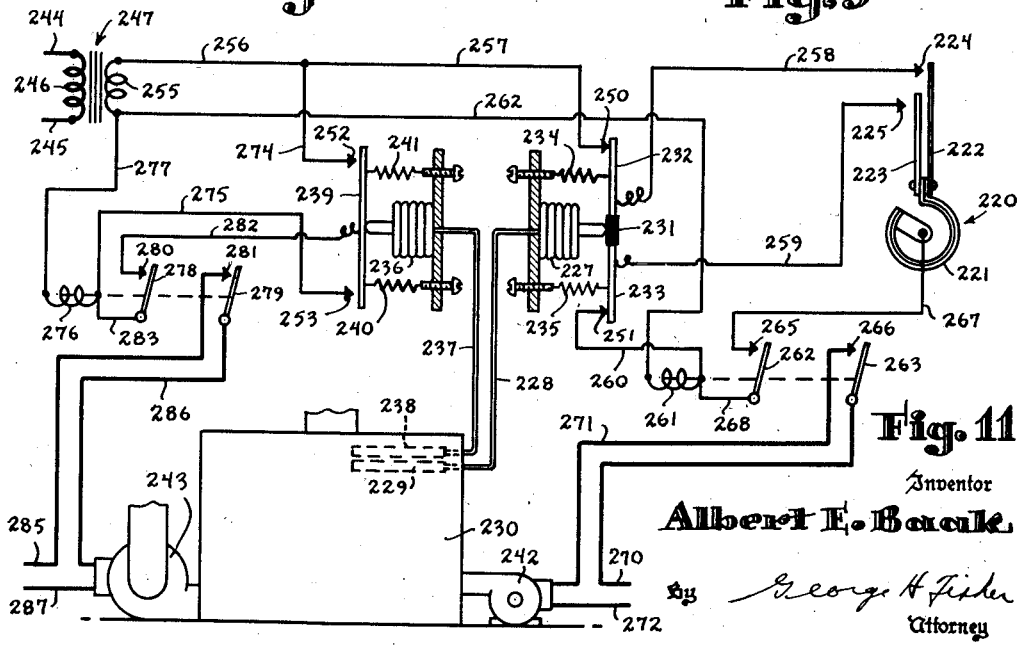
Fig. 11
Inventor
Albert E. Baak
by George H. Fisher
Attorney Patented Dec. 16, 1941

2,266,144

UNITED STATES PATENT OFFICE 2,266,144

AUTOMATIC SWITCHING DEVICE

Albert E. Baak, Minneapolis, Minn., assignor to Minneapolis-Honeywell Regulator Company, Minneapolis, Minn., a corporation of Delaware Application August 4, 1939, Serial No. 288,254

11 Claims. (Cl. 200—83)

This invention relates to switching devices in which a plurality of switches are actuated by a single condition responsive device.

It is an object of the present invention to provide these switches with individual adjustments whereby the condition value at which each is operated may be independently varied.

A further object is to provide a switching unit which can be used as a combination high and low limit control in connection with a temperature changing system. In this unit individual adjustments are provided for the high and low limits. The low limit control comprises a pair of sequentially operating switches, both of which must be closed to render the control operative and both of which must be opened to render it inoperative. It is also an object of the invention to provide one of these switches with a further adjustment in addition to the main adjustment. The high limit control is identical to the low limit control but operates at a different condition value due to the two main adjustments.

Another object appears in connection with the combination high and low limit control when used on a summer-winter heating system and when operated by means of a thermostat placed in the boiler. The adjusting means for the high limit switches is provided with two indicating scales, one calibrated in temperature degrees when used in a hot water heating system, and one calibrated in pounds when used in a steam heating system. The same thermostat is used in each case. The low limit is calibrated in degrees only, because it operates always at temperatures below that at which water boils.

Another object of the invention is to provide a floating lever which is operatively engaged by a condition responsive element at a mid point, and to oppose movement of the lever by spring means connected to each end of the lever whereby first one end and then the other end of the lever is moved by the condition responsive element depending upon the adjustment of each spring.

Another object is to provide a unit of the above type in which there is an interlock between the two adjusting means so that the switching sequence cannot be changed.

These and other objects will readily become apparent as the following specification is read in the light of the accompanying drawings, in which:

Figure 1 is a plan view of one form of my invention;

Figure 2 is a side elevation looking from the right of Figure 1;

Figure 3 is a front elevation of the form shown in Figure 1;

Figure 4 is a section taken along the lines 4—4 of Figure 1 and looking in the direction of the arrows;

Figure 7 shows a relay panel on which the control device illustrated in Figures 1 to 5 is adapted to be mounted;

Figure 8 is an adjustment indicating panel for a modified form of my invention;

Figure 9 is a view of the adjusting gears with the cover removed;

Figure 10 is a detailed view of the adjusting gears, and

Figure 11 is a schematic wiring diagram showing how the modified form of my invention may be used as a combination fan and high limit control.

Figure 5:
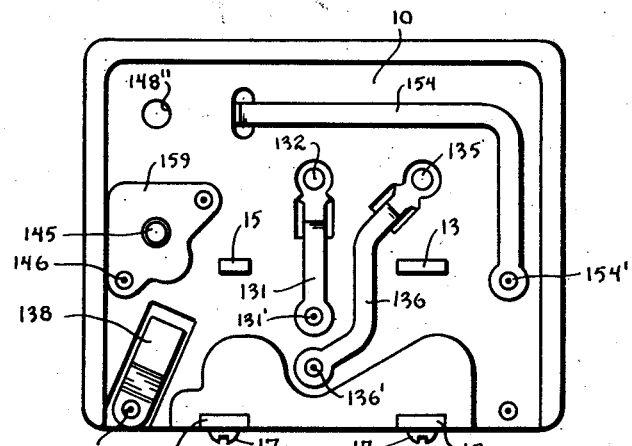
Figure 5 is a view of the bottom of the device showing the wiring connections.

Referring to Figures 1 to 4, reference numeral 10 indicates an insulating base which supports the switching device of my invention. Mounted on the base 10 is a supporting member generally indicated at 11 which comprises four legs 12, 13, 14, and 15 and an integral connecting portion 16. The legs 12 and 14 are connected to the base by means of screws 17 and legs 13 and 15 are provided with projections which extend through holes in the base in order to properly position them. (See Figure 5.) Indicated at 20 is the main adjusting lever having one end 21 which is provided with a pair of ears operating between stops 22 and 23 on the legs 14 and 15. The other end 24 of the lever 20 is provided with a pair of ears operating between the stops 25 and 26 on the legs 12 and 13. Pivotally mounted between legs 12 and 13 as indicated at 28 is a link 29 which is also pivoted to the lever 20 at its mid portion as shown at 30. The purpose of this link is to prevent lateral or longitudinal movement of the lever with respect to the support 11. A pair of adjusting nuts 31 and 32 are provided with stem portions 33 which extend through the holes 34 in the connecting portion 16 of the supporting member 11. Shoulder portions 35 are provided for supporting the nuts as shown. These nuts are internally threaded for the purpose of adjustably supporting screws 36. Screws 36 have a longitudinal opening which loosely receives the headed calibrating screws 37. Adjustably positioned on the screws 37 are a pair of nuts 38, one of which carries the upper end of the main adjusting spring 39 and the other of which carries adjusting spring 40.

The end 21 of the lever 20 carries an insulating plate 43 having a hole therethrough to accommodate the looped end 44 of the adjusting spring 39. In this manner, the spring 39 through its engagement with the insulating member 43 normally holds the end 21 of the lever 20 against the stops 22. End 24 of lever 20 carries an insulating plate 45 similar to the plate 43 and having a hole for accommodating the hooked end 46 of the adjusting spring 40. Spring 40 normally holds the end 24 of the lever 20 against the stops 25.

The screws 36 are each provided with a rigidly attached arm 48 having a projecting portion 49 (see Figure 2) which extends through slots (not shown) in the legs 12 and 14. The purpose of this arrangement is to prevent the rotation of the screws 36 when the nuts 31 and 32 are rotated. The shoulder portion 35 of the nut 32 is provided with a center hole in which is inserted a hub 50 having a rigidly connected scale plate 51. The hub 50 and scale plate 51 are rotatably adjustable with respect to the nut 32 by means of the screw 52 which is positioned in a tapped hole in the shoulder portion 35 and which engages the hub 50. Scale plate 53 and hub 54 are adjustably positioned on the shoulder portion 35 of the nut 31 in the same manner.

From the above description, it will be obvious that rotation of scale plate 51 and nut 32 will vertically adjust the nut 38 and hence vary the tension of the spring 40, and in a like manner rotation of the scale plate 53 will adjust the tension of the spring 39.

The four legs 12, 13, 14 and 15 are adapted to support the plate 56 which carries a bellows 57. Capillary tube 58 connects the bellows 57 to a thermal bulb which is placed in the area to whose temperature it is desired that the bellows respond. It is obvious that the bellows 57 could be made to respond to pressure instead of temperature if desired. The lower end of the bellows is provided with a point 60 which seats in the bearing member 61 carried by the lever 20. Expansion of the bellows will therefore have the effect of pushing the lever 20 in a downwardly direction as seen in Figures 2, 3, and 4.

The insulating base 10 is provided with a pair of projections 63 and 64 whose upper ends are connected by means of a metallic plate 65. (See Figure 2.) Adjustably positioned in the plate 65 are a pair of stationary contacts 66 and 67. The contact 67 projects slightly lower than the contact 66 for a purpose which will appear hereinafter. The insulating base 10 is provided with a second pair of projections 68 and 69 at the other end of the supporting member. Metallic member 70 carried by projection 68 adjustably positions the stationary contact 71 and metallic member 72 carried by the projection 69 adjustably positions the contact 73. The contact 73 extends slightly lower than the contact 71 for a purpose which will appear later.

The insulating base 10 also carries a center projection 75 on which is positioned a resilient contact blade 76 carrying at one end the movable contact 77 which is adapted to engage contact 66 and at the other end it carries the movable contact 78 which is adapted to engage the contact 71. Placed alongside of the contact blade 76 on the projection 75 is a second contact blade 79, one end of which is reinforced by a stiff blade 80 which carries contact 81 which cooperates with the stationary contact 67. The other end of the blade 79 carries a reinforcing blade 82 which carries a contact 83 which cooperates with the stationary contact 73.

Adjusting arm 85 is provided with projections 86 which ride in the slot 87 in arm 13. A screw having a knurled head 88 screw-threadedly engages the arm 85 to tighten it in the slot 87 and thereby hold it in any desired adjusted position therein. The inner end of the arm 85 is provided with a hole 90 in which is hooked one end of an adjustment spring 91. The other end of the spring 91 supports a link 92 which engages the hooked end 93 of the stiff blade 80. The link 92 has been broken away in Figure 2 in order to show the contact structure more clearly. The effect of the spring 91 is to normally hold the contact 81 in engagement with contact 67 and the force with which these contacts are held in engagement is adjustable by means of the arm 85 in the slot 87. Likewise, the arm 94 is adjustable in slot 95 by means of the screw 96. Arm 94 carries the adjustment spring 97 which through the link 98 engages the blade 82 to hold contact 83 into engagement with the contact 73. Spring 97 is adjustable in the same manner as spring 91.

Bracket 99 carried on the connecting portion 16 of the supporting member 11 carries the screws 100 and 155 and clamps 101 which clamp the scale plates 51 and 53 to prevent their accidental displacement after they have once been moved to their adjusted positions. It is noted that the scale plate 51 carries markings which represent temperatures in degrees Fahrenheit and that the scale plate 53 carries two sets of markings, one set being in degrees Fahrenheit and the other set being in pounds pressure. The purpose of the two scales on the plate 53 will appear in the description of the system in which the switching mechanism is adapted to be used.

Figures 1 to 4 disclose the parts in the positions that they will occupy when the temperature to which the bellows 57 responds is at a low value. It will be understood that the spring 40 will be adjusted so that the end 24 of the lever 20 will be actuated at one temperature and the spring 39 will be adjusted so that the end 21 of the lever 20 will be actuated at a second temperature. As shown in Figure 1, the scale plate 51 has been so adjusted that the end 24 will be actuated at a temperature of 150° and the scale plate 53 has been adjusted so that the end 21 will be actuated at a temperature of 180°. As the temperature to which the bellows responds increases to a value of 150°, the bellows will start to expand and due to the adjustments of the scale plates 51 and 53, the spring 39 will oppose this expansion with a greater force than the spring 40. Due to this fact the end 24 of the lever 20 will first start to move in a downwardly direction. After it has moved a slight distance, it will first engage the spring blade 76 to move the contact 77 out of engagement with the stationary contact 66. This is due to the fact that the contact 66 does not extend down as far as the contact 67. On a very slight additional movement of the end 24 of the lever 20, the insulating plate 45 will engage the stiff blade 80. As movement of the member 80 is resisted additionally by the spring 91, the lever 20 will remain stationary until the temperature to which the bellows responds has risen sufficiently for the bellows 57 to develop an additional force to overcome the tension of this spring. At this time the bellows will again expand and separate the contact 81 from the stationary contact 67. A slight additional movement of the lever 20 will cause the end 24 to engage the stop 26 and prevent its further movement. The lever 20 will remain in this position until the temperature rises to 180° indicated on scale plate 53, at which time the bellows 57 will exert sufficient force to overcome spring 39 and move the end 21 of the lever 20 out of engagement with the stops 22 causing the insulating plate 43 to engage the spring blade 76 and separate the contact 78 from the contact 71. As contact 73 extends lower than contact 71 it will require a slight additional movement of the bellows to cause the plate 43 to engage member 82 whose movement is additionally opposed by the tension spring 97. The lever 20 will therefore not move further until bellows 57 has developed sufficient force, due to a further increase in temperature, to overcome the tension of the spring 97 at which time the plate 43 will move the contact 83 out of engagement with contact 73. A slight additional expansion of the bellows will cause the end 21 of the lever 20 to engage the stops 23 after which no additional downward movement of the lever 20 can take place.

On a decrease in the temperature to which the bellows responds the bellows will contract causing contacts 83, 78, 81, and 77 to engage their respective stationary contacts in the order named. It will be seen therefore that this mechanism provides for one adjustment for determining the temperature value at which one pair of switches is actuated and a second adjustment for determining the temperature value at which the second pair of switches is actuated. Furthermore, the springs 91 and 97 provide for the individual adjustment of the differential between each pair of switches.

Figure 6:
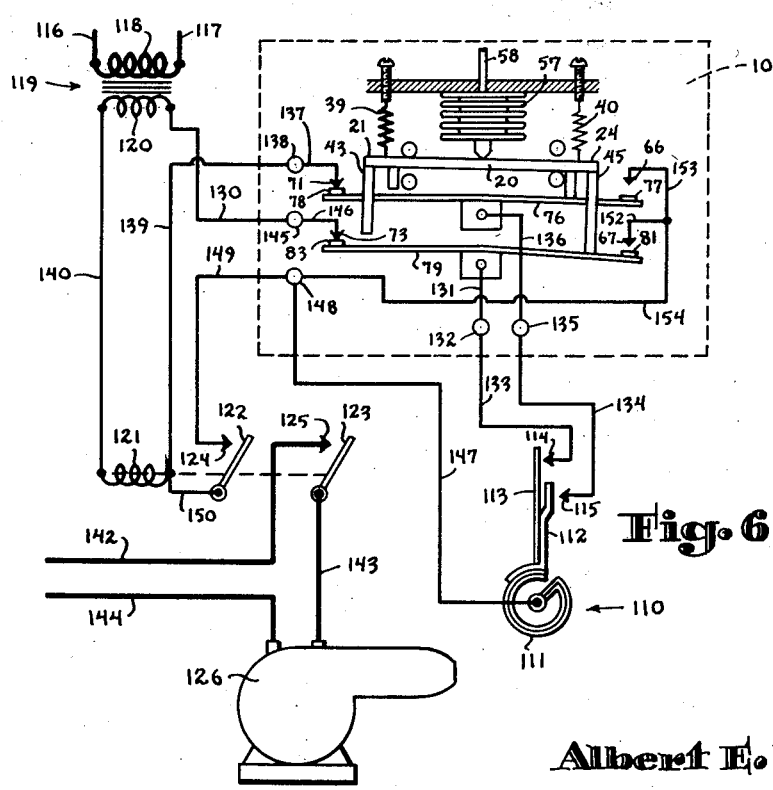
Figure 6 is a schematic wiring diagram showing how my invention may be used as a combination high and low limit control for a heating system.

Figure 6 illustrates diagrammatically a heating system in which the above mechanism may be advantageously used. The insulating panel 10 has been shown in dotted lines in this figure which also shows the bellows 57, main adjusting springs 39 and 40, contact blades 76 and 79 as well as the various movable and stationary contacts. It will be appreciated that the insulating plates 43 and 45 have been shown as comprising two separate legs merely for the sake of clarity and convenience. The room thermostat indicated generally at 110 comprises a bimetallic coil 111 which is fixed at one end and which carries at its free end a pair of contact blades 112 and 113. These blades are so arranged that on a decrease in temperature the blade 113 will engage contact 114 first and on a further decrease in temperature the blade 112 will engage the contact 115. Electrical energy is supplied from the line wires 116 and 117 to the primary 118 of a transformer 119. The transformer is provided with a secondary winding 120 which supplies electric power at a reduced voltage to the control system. The relay winding 121 upon energization is adapted to pull in the switch blades 122 and 123 to engage the contacts 124 and 125, respectively. A temperature changing device such as an oil burner motor is indicated at 126 but it will be appreciated that any other type of heating device may be substituted therefor. In this case the capillary 58 connects the bellows 57 to a thermal bulb which is placed in the boiler of the furnace heated by the temperature changing device 126.

With the parts in the positions shown in Figure 6, the boiler water temperature will be between 150° and 180° because the end 24 of lever 20 has opened its switches whereas the end 21 of the lever 20 is permitting its switches to remain closed. The room thermostat 110 is shown as being satisfied and the burner motor 126 is therefore deenergized. On a decrease in room temperature the resilient blade 113 will first engage the stationary contact 114 but no circuit will be established at this time due to the fact that the switch blade 122 is in open position and the switch blade 112 has not yet engaged the contact 115. On a further decrease in room temperature, the switch blade 112 will engage the stationary contact 115 and establish the following circuit: secondary winding 120, conductor 130, terminal 145, conductor 146, stationary contact 73, contact 83, switch blade 79, conductor 131, terminal 132 on the insulating base 10, conductor 133, contact 114, switch blades 113 and 112, contact 115, conductor 134, terminal 135 on insulating base 10, conductor 136, switch blade 76, contact 78, contact 71, conductor 137, terminal 138 on insulating base 10, conductor 139, relay winding 121, and conductor 140 back to the secondary 120. This circuit energizes the relay winding 121 causing the switch blades 122 and 123 to engage their respective contacts 124 and 125. The engagement of the blade 123 with contact 125 energizes the burner motor 126 by means of the line wire 142, contact 125, switch blade 123, conductor 143, burner motor 126, and line wire 144. The engagement of the switch arm 122 with contact 124 establishes a holding circuit for the relay winding 121 independently of the switch blade 112 and contact 115. This circuit is as follows: secondary winding 120, conductor 130, terminal 145 on insulating base 10, conductor 146, contacts 73 and 83, switch blade 79, conductor 131, terminal 132, conductor 133, contact 114, switch blade 113, bimetallic element 111, conductor 147, terminal 148 on the insulating base 10, conductor 149, contact 124, switch blade 122, conductor 150, relay winding 121, and conductor 140 back to the other side of the secondary 120. Because of this circuit, the relay winding 121 will not be deenergized on an increase in room temperature until the switch blade 113 disengages the contact 114.

Assuming that the room thermostat 110 continues to call for heat, the boiler water temperature will increase and after it reaches a temperature of 180°, as set on the scale plate 53, the bellows 57 will begin to expand first disengaging the contacts 71 and 78. Disengagement of these contacts will have no effect upon the system due to the fact that the holding circuit traced above does not pass through these contacts. Further expansion of the bellows 57 will disengage the contacts 73 and 83 which will break the above traced circuits and deenergize the relay winding 121. This will result in deenergizing the burner motor 126 and the boiler water temperature will therefore begin to decrease. Reengagement of the contacts 83 and 73 will not reenergize the relay winding 121 at this time because the original energizing circuit for the relay must pass through the contacts 71 and 78 due to the fact that the holding contacts 122 and 124 are open. After the boiler water temperature has decreased to a point where the bellows 57 reengages the contacts 71 and 78, the relay winding 121 will be reenergized providing the switch blades 113 and 112 are engaging the stationary contacts 114 and 115. In other words, the energizing circuit for the relay 121 must pass through contacts 83 and 73, 114 and 113, 112 and 115, and also 71 and 78. After the relay has been pulled in, the holding circuit includes the contacts 83 and 73, 114 and 113, and 122 and 124.

If the room thermostat 110 remains satisfied for a sufficient length of time, the boiler water temperature will decrease to slightly below 150, at which time the bellows will contract to cause the contacts 81 and 67 to engage. Engagement of these contacts will not affect the system due to the fact that the circuit to the secondary winding 120 must pass through the contacts 66 and 77. On further decrease in boiler temperature, the contacts 66 and 77 will be engaged at which time the relay winding 121 will be energized by the following circuit: secondary 120, conductor 130, terminal 145, conductor 146, contacts 73 and 83, contact blade 79, contacts 81 and 67, conductors 152 and 153, contacts 77 and 66, switch blade 76, contacts 78 and 71, conductor 137, terminal 138, conductor 139, relay winding 121, and conductor 140 back to the other side of the secondary 120. Energization of the relay 121 will energize the burner motor 126 and will close the holding contacts 122 and 124 which establishes a holding circuit for the relay winding 121 independently of the contacts 66 and 77. This circuit goes from the secondary 120, conductors 130 and 146, contacts 73 and 83, switch blade 79, contacts 67 and 81, conductors 152, 154, and 149, contacts 124 and 122, conductor 150, relay winding 121, and conductor 140 back to the secondary winding 120. It will therefore be seen that to energize the relay winding 121 by the limit switches actuated by the bellows 57, that all four of these switches must be in closed position and that in order to break the circuit to the relay winding 121 the contacts 81 and 67 in addition to contacts 66 and 77 must be opened. In other words, the relay will be pulled in at one temperature and will be broken at a higher temperature thereby establishing a definite differential of operation. It will be noted also that a differential of operation is established by the high limit switches 73 and 83 and 78 and 71 and also by the room thermostat with its two sequentially operating switch blades 113 and 112. The result of this operation is that the burner motor can never be operated on and off rapidly, but after it has once been turned on it must remain on until the temperature of the boiler water or the temperature in the room has been raised a predetermined amount, and after it has been deenergized either by the limit switch or by the room thermostat it must remain deenergized until the boiler water has decreased in temperature or the room has decreased in temperature a predetermined amount.

In the above description of operation, it has been assumed that the control is placed on a hot water heating system in which the high limit switch operates at 180°. This same control device may also be used in connection with a steam heating system. In this case, the limit switch will be actuated at a higher temperature which will be above 212° and somewhere in the steam range. In order to adapt the control device for such use, the adjusting dial 53 must be rotated in a direction to increase the tension of the spring 39 and to place the scale which is calibrated in pounds pressure adjacent the indicating means. In the first place, attention is called to the fact that the screw 155 limits the rotation of the scale plate 53 in its adjustment over the range from 140° to 190°. In order to change to the pressure scale, the screw 155 is loosened and moved to the right in its slot 156, at which time the shoulder 157 on the plate 53 may pass by the screw 155 so that the plate may be rotated in a clockwise direction until the pressure scale is opposite the screw. When the proper adjustment on the pressure scale has been made, the screw 155 is again moved to the left and tightened to clamp the plate 53 in its adjusted position. In order that the plate 53 cannot be rotated in the wrong direction to change over from the temperature to the pressure scale, the projection 158 is made sufficiently long so that it cannot pass the screw 155 even after it has been retracted in the slot 156. In other words, to change from the temperature to the pressure scale, the plate 53 must be rotated in a clockwise direction and to change from the pressure to the temperature scale it must be rotated in a counterclockwise direction. The scale plate 51 is calibrated in degrees only because the low limit switch is to be operated at a temperature well below that of the boiling point of water regardless of whether the control device is used on a hot water or a steam heating system.

In Figure 7, a relay panel 160 is shown as supporting the transformer 119 and the relay 121. The terminals 138', 145', and 148' are disclosed and as seen in connection with the schematic diagram of Figure 6 wires 134, 133, and 147 may be connected thereto in the order named if it is desired that the burner motor 126 be controlled by the room thermostat only. It is one of the primary objects of the present invention to design this combination high and low limit control so that it may be integrally mounted on the relay panel 160 in the simplest manner possible. In order to insert this limit control into the circuits, it is necessary merely to remove the terminal screws 145' and 148' and disconnect all three of the wires 134, 133, and 147. It will be noted that the screw 145 is permanently mounted in a recess in the insulating panel 10 by means of the plate 159 connected to the bottom of the base 10 as seen in Figure 5. A spring contact member 138 is also supported on the bottom of the base by means of the rivet 137. The control device is placed on the panel 160 so that the spring blade 138 makes contact with the terminal screw 138' on the panel 160. The screw 145 which is permanently mounted in the base 10 is screwed into the panel 160. The terminal screw 148 is inserted through the hole 148'' in the base 10 and screwed into the panel 160. These two screws 145 and 148 serve to mount the control device on the panel 160 and maintain the spring blade 138 in engagement with the terminal screw 138'. The room thermostat 110 is now connected to the control device by connecting wire 147 to the terminal 148, wire 133 to the terminal screw 132 mounted on base 10 and wire 134 to terminal screw 135 also mounted on base 10. The control device is internally wired so that these are the only connections necessary to properly insert this device in the circuit. Comparing Figures 5 and 6, it will be seen that the rivet 137 in Figure 5 connects spring 138 to member 70 and contact 71 in Figure 4 and corresponds to conductor 137 in Figure 6 and that the rivet 146 connects screw 145 and plate 159 to member 72 and contact 73 in Figure 3 and corresponds to the conductor 146. Likewise, the conductors 131, 136, and 154 in Figure 5 correspond to these same conductors in Figure 6. The rivet 131' shown in Figure 5 connects conductor 131 with the spring blade 79 and the rivet 136' in Figure 5 connects conductor 136 with the spring blade 76 shown in Figure 4. Therefore the only operations required to insert this control device into the control circuit is to remove the terminal screws 145 and 148 in the panel 160 and use them to support the base 10 on the panel 160 and then wire the thermostat to the terminals 148, 132, and 135 on the base 10.

Another use to which this control device may be put is to act as a combination high limit and fan control for a hot air heating system. Such a system has been shown diagrammatically in Figure 11. In view of the fact that the range between the highest temperature to which the limit switch may be adjusted and the lowest temperature to which the fan switch may be adjusted is too large to be properly handled by a single temperature responsive bellows, two separate control units are provided, each of which is actuated by a separate bellows. As in the case of the combination high and low limit control, it is necessary to actuate only four switches and as two separate levers are actuated by the bellows each end of each lever actuates a single switch instead of the two switches where only a single lever is used. Inasmuch as the two switches of each device are used in combination with a relay and holding circuit as described above, the movement of one end of the lever controls the temperature at which the relay is pulled in and movement of the other end of the lever controls the temperature at which the relay is dropped out. These temperatures are individually adjustable by means of the two springs and in order to prevent the springs from being so adjusted that the sequence of switch operation is changed, some sort of an interlock between the adjusting devices is necessary. Such an interlock is disclosed in Figures 9 and 10.

Referring to Figure 10, the reference numeral 200 indicates the connecting portion of a supporting member similar to supporting member 11 of Figures 1 to 4. Two adjusting nuts are provided at 201 and 202 for adjusting the springs (not shown) which determine the operation of the switching device. The nut 201 has an upwardly projecting stem 203 which is provided with a kerf so that the nut 201 may be rotated in order to adjust its spring. The supporting member 200 is provided with an axle 204 between the two adjusting nuts on which there is concentrically mounted a pair of gears 205 and 206. The pinion gear 207 is mounted on the stem 203 and as this stem is rotated to adjust the nut 201, the gear 207 meshes with the gear 206 to rotatably position it on its axle. In like manner, when the stem 208 on nut 202 is rotated the pinion gear 209 meshes with the gear 205 to position it in accordance with the adjustment of the nut 202. As seen in Figure 9, the gear 206 is provided with indicia which cooperate with an indicator (Figure 8) to indicate the adjustment of the nut 201. The gear 206 is also provided with an arcuate slot 210 through which is visible a scale 211 on the gear 205. The gear 205 is provided with a pin 212 which projects through the slot 210 to limit the relative rotation between the two scales. This limits the relative adjustments of the nuts 201 and 202 so that one of the adjustment springs must always exert the greater force and therefore one of the switches actuated by this device must always be closed before the other switch. A cover plate 215 is carried by the supporting member 200 by means of screws 216.

The two control devices are located side by side and each is provided with the adjusting device just described. The cover 215 is large enough to cover both of these devices and is provided with holes 217 through which the stems on the adjusting nuts project. It will be noted with reference to Figure 8 that the cover plate 215 indicates which is the high limit and which is the fan control and also which scale indicates the cut-off temperature and which the cut-on temperature. There is also an indication adjacent each of the steps of the adjusting nuts as to which limit that particular stem is adapted to adjust.

Referring now to Figure 11, the room thermostat 220 is shown as being comprised of a bimetallic coil 221 which is fixed at one end and carries at its free end a pair of switch arms 222 and 223 which on a fall in temperature engage stationary contacts 224 and 225 in the order named. The high limit control comprises a bellows 227 which is connected by means of a capillary tube 228 to a thermal bulb 229 located in the bonnet of the furnace 230. The bellows 227 actuates the floating lever 231 having insulated ends 232 and 233. Movement of the lever 231 by the bellows 227 is opposed by means of the springs 234 and 235. It will be understood that the bellows, lever, and adjusting springs are substantially the same as described in connection with Figures 1 to 4.

Bellows 236 is connected by means of the capillary 237 to the thermal bulb 238 located in the bonnet of the furnace. This bellows actuates a floating lever 239 against the force exerted by springs 240 and 241. The usual oil burner or other heating device is shown at 242 and a fan 243 is provided for forcing the air through the furnace and into the rooms to be heated. The electric power for the control system is supplied from the lines 244 and 245 to the primary winding 246 of the step-down transformer 247.

Assuming that the air in the bonnet of the furnace is relatively cool, the bellows 227, which acts as the high limit control, will be contracted so that switch arms 232 and 233 will be in engagement with the stationary contacts 250 and 251. The bellows 236, which controls the fan, will also be contracted so that the switch arm 239 is out of engagement with contacts 252 and 253. On a decrease in room temperature the bimetallic element 221 of the room thermostat 220 will move the flexible contact arm 222 into engagement with its stationary contact 224. The closure of this switch will have no effect on the circuit. On a further decrease in temperature the switch arm 223 will be moved into engagement with its stationary contact 225 at which time the following circuit will be established: from the secondary winding 255 of the transformer 247, conductors 256, 257, contact 250, switch arm 232, conductor 258, contact 224, contact arms 222 and 223, contact 225, conductor 259, switch arm 233, contact 251, conductor 260, relay winding 261, and conductor 262 back to the secondary 255. This will energize the relay winding 261 and pull in the switch arms 262 and 263 which will cause them to engage contacts 265 and 266, respectively. The engagement of switch arm 262 with contact 265 will set up a holding circuit for the relay winding 261 independently of the switch arm 223, and contact 225. This circuit extends from conductor 258, contact 224, switch arm 222, bimetallic element 221, conductor 267, contact 265, switch arm 262, and conductor 268 to the relay coil 261. Engagement of the switch arm 263 with the contact 266 establishes a circuit from the line wire 270, switch arm 263, contact 266, conductor 271, and burner motor 242 back to the other line wire 272. This results in energizing the burner motor 242 which increases the temperature of the air within the bonnet of the furnace. An increase in this air temperature to 120°, as set on the scale in Figure 8, causes an expansion of the bellows 236 which first causes the contact blade 239 to engage the stationary contact 252. Closure of these contacts does not affect the circuits. On further increase in air temperature to 140° the bellows 236 causes the switch blade 239 to engage stationary contact 253 which establishes the following circuit: from secondary winding 255, conductors 256 and 274, contact 252, switch blade 239, contact 253, conductor 275, relay winding 276 and conductor 277 back to the secondary 255. This energizes the relay winding 276 which causes the switch arms 278 and 279 to engage stationary contacts 280 and 281, respectively. Engagement of the switch arm 278 with contact 280 sets up a holding circuit for the relay winding 276 independently of the stationary contact 253. This circuit extends from conductor 274, contact 252, switch blade 239, conductor 282, contact 280, switch arm 278, and conductor 283 to the relay winding 276. The relay winding 276 will therefore remain energized until the contact blade 239 separates from the stationary contact 252.

The energization of the relay winding 276 also causes the switch arm 279 to engage the contact 281 which sets up a circuit from the line wire 285 to contact 281, switch arm 279, conductor 286, and fan motor 243 back to line wire 287. The system is now operative to deliver hot air to the various rooms to be heated. This action will continue until the room thermostat 220 causes both switch arms 222 and 223 to separate from contacts 224 and 225. If the room thermostat 220 should continue to call for heat until the air temperature in the bonnet of the furnace reached 180°, as set on the high limit scale in Figure 8, bellows 227 would expand and move switch arm 233 out of engagement with contact 251. This would have no effect upon the system due to the holding circuit for relay winding 261. If the bonnet temperature increased to 220° bellows 227 would move arm 232 out of engagement with contact 250 and deenergize relay winding 261 thereby deenergizing the burner motor 242. After the burner motor 272 has once become deenergized due to the dropping out of the relay 261, it cannot be reenergized until the high limit bellows closes both of its switches and the room thermostat 220 closes both of its switches. It is clear of course that after the burner motor has been deenergized, the fan will continue to run until the temperature of the air in the bonnet is decreased to a point where the bellows 236 causes the switch blade 239 to disengage both contacts 252 and 253.

It will be appreciated that the switching devices used in the combination fan and high limit control are substantially the same as those used in the combination high and low limit control and that the only reason a single bellows is not used is because the temperature range is too great. Also, whereas in the combination high and low limit devices one end of the lever actuates both of the high limit switches, in the fan and high limit control devices one end of the lever actuates one of the high limit switches and the other end of the lever actuates the other of the high limit switches. In every case, however, the arrangement of the bellows, the main adjusting lever and the two adjusting springs for the lever remain the same.

As other changes and modifications in this invention may occur to those skilled in the art, I wish to point out that I am to be limited by the scope of the appended claims rather than by the specific embodiments of the invention disclosed herein.

I claim as my invention:

1. A control device comprising in combination, an actuating member, a condition responsive device operatively engaging said member at an intermediate point, first and second means connected to said member at opposite sides of said point for resisting movement of said member by said condition responsive device, means for individually adjusting said means, and control devices actuated respectively by opposite ends of said member.

2. A control device comprising in combination, an elongated actuating member, a pair of circuit controlling means actuated selectively by the ends of said member, a condition responsive device operatively engaging said member at an intermediate point, biasing means associated with each end of said member for exerting different effects thereon whereby said circuit controlling means are actuated at different values of said condition, and means for adjusting at least one of said biasing means to vary the condition value at which the corresponding circuit controlling means is actuated.

3. A control device comprising in combination, and actuating member, a condition responsive device operatively engaging said member at an intermediate point, first and second means connected to said member at opposite sides of said point for resisting movement of said member by said condition responsive device, means for individually adjusting said means, control devices actuated respectively by opposite ends of said member, a stationary support, and a link pivotally connected to said support and said member whereby said member cannot be laterally displaced.

4. A control device comprising in combination, a floating lever, a first spring connected to one end of said lever, a second spring connected to the other end of said lever, a condition responsive device engaging said lever at an intermediate point for moving first one and then the other end of said lever against the action of said springs depending upon which spring exerts the greater force, a first switch actuated by one end of said lever, a second switch actuated by the other end of said lever, and individual adjusting means for each spring whereby the condition value at which each switch is actuated may be individually adjusted.

5. A control device comprising in combination, a floating lever, a first spring connected to one end of said lever, a second spring connected to the other end of said lever, a condition responsive device engaging said lever at an intermediate point for moving first one and then the other end of said lever against the action of said springs depending upon which spring exerts the greater force, a first switching means actuated by one end of said lever, a second switching means actuated by the other end of said lever, each switching means comprising a first switch movable to open position by said lever, a second switch movable to open position by said lever after said first switch has been opened, and adjustable spring means opposing opening of said second switch whereby the differential between the opening values of said first and second switches may be varied.

6. A combination high and low limit control comprising a floating lever, a first spring connected to one end of said lever, a second spring connected to the other end of said lever, a temperature responsive bellows engaging said lever at an intermediate point for moving first one end of said lever and then the other against the action of said springs depending upon which spring exerts the greater force, a limit switch actuated by each end of said lever, individual adjusting means for each spring, and two scales cooperating with one of said adjusting means, one scale being calibrated in degrees for when the bellows responds to hot water temperature, the other scale being calibrated in pounds for when the bellows responds to steam pressure.

7. A unitary high and low limit control for use in controlling the boiler temperature in a summer-winter heating system comprising in combination, a high limit switch, a low limit switch, a single thermostatic element responsive to boiler temperature for actuating both switches, adjusting means for adjusting the temperature at which said low limit switch is actuated, said temperature being always below the boiling point of water, a scale for indicating said adjustment in degrees, a second adjusting means for adjusting said high limit switch, said second adjusting means having two ranges, one range for use in a hot water heating system and the other range for use in a steam heating system, and a pair of scales for indicating the adjustment of said second adjusting means, one scale being calibrated in degrees for indicating the adjustment when said one range is being used, the other scale being calibrated in pounds for indicating the adjustment when said other range is being used.

8. A control device comprising in combination, a floating lever, a first spring connected to one end of said lever, a second spring connected to the other end of said lever, a condition responsive device engaging said lever at an intermediate point for moving first one and then the other end of said lever against the action of said springs depending upon which spring exerts the greater force, a pair of stops for each end of said lever, a first switching unit comprising a pair of stationary contacts adjacent said one end of said lever, a pair of contact blades biased into engagement with said contacts, said stationary contacts being so adjusted that as said lever is actuated it moves first one contact blade and then the other out of engagement with its stationary contact, a third spring connected to said other contact blade and resisting its movement by said lever, means for adjusting said third spring whereby the condition value at which said other contact blade is moved may be varied independently of said first spring, and a second switching unit similar to said first switching unit associated with the said other end of said lever.

9. A control device comprising in combination, a floating lever, a first spring connected to one end of said lever, a second spring connected to the other end of said lever, a condition responsive device engaging said lever at an intermediate point for moving first one and then the other end of said lever against the action of said springs depending upon which spring exerts the greater force, a first switch actuated by one end of said lever, a second switch actuated by the other end of said lever, an adjusting means for said first spring, an adjusting means for said second spring, and an interlock between said adjusting means preventing them from being adjusted in a manner to change the sequence of switch operation.

10. A control device comprising in combination, a floating lever, a first spring connected to one end of said lever, a second spring connected to the other end of said lever, a condition responsive device engaging said lever at an intermediate point for moving first one and then the other end of said lever against the action of said springs depending upon which spring exerts the greater force, a first switch actuated by one end of said lever, a second switch actuated by the other end of said lever, an adjusting means for said first spring, an adjusting means for said second spring, a pair of concentrically mounted indicating members, one operated by one of said adjusting means and one operated by the other, and an interlock between said indicators to prevent the sequence of switch operation from being changed by either of said adjusting means.

11. A control device comprising in combination, a floating lever, a first spring connected to one end of said lever, a second spring connected to the other end of said lever, a condition responsive device engaging said lever at an intermediate point for moving first one and then the other end of said lever against the action of said springs depending upon which spring exerts the greater force, a first switch actuated by one end of said lever, a second switch actuated by the other end of said lever, an adjusting means for said first spring, an adjusting means for said second spring, a pair of concentrically mounted indicating members, one operated by one of said adjusting means and one operated by the other, a slot in one member, a pin on the other member riding in said slot so as to limit the relative adjustment of said adjusting means.

ALBERT E. BAAK.